United States Patent
Hansen et al.

(10) Patent No.: US 8,574,475 B2
(45) Date of Patent: Nov. 5, 2013

(54) PROCESS OF AND APPARATUS FOR MAKING MINERAL FIBERS

(75) Inventors: Lars Elmekilde Hansen, Roskilde (DK); Lars Boellund, Slangerup (DK); Lars Kresten Hansen, Roskilde (DK); Peter Farkas Bindercup Hansen, Birkerod (DK); Leif Moeller Jensen, Frederiksberg C (DK)

(73) Assignee: Rockwool International A/S (DK)

( * ) Notice: Subject to any disclaimer, the term of this patent is extended or adjusted under 35 U.S.C. 154(b) by 533 days.

(21) Appl. No.: 12/522,474

(22) PCT Filed: Jan. 14, 2008

(86) PCT No.: PCT/EP2008/000216
§ 371 (c)(1), (2), (4) Date: Jul. 8, 2009

(87) PCT Pub. No.: WO2008/086991
PCT Pub. Date: Jul. 24, 2008

(65) Prior Publication Data
US 2010/0109197 A1 May 6, 2010

(30) Foreign Application Priority Data
Jan. 15, 2007 (EP) .................................. 07250138

(51) Int. Cl.
C03B 37/04 (2006.01)
D01D 1/04 (2006.01)
D01D 5/18 (2006.01)
D01D 13/00 (2006.01)
D01F 9/08 (2006.01)

(52) U.S. Cl.
USPC .............. 264/211.1; 65/470; 65/521; 65/522; 264/211.11; 425/381.2; 425/425

(58) Field of Classification Search
USPC .............. 264/211, 627, 639, 640, 211.14, 264/211.22, 913, 441, 37.28, 172.11, 8, 264/211.1, 211.11, 311; 65/454–460, 521, 65/522, 29.13, 469, 470; 425/8, 425, 425/381.2
See application file for complete search history.

(56) References Cited

U.S. PATENT DOCUMENTS 2,156,316 A * 5/1939 Slayter et al. ............... 65/525
(Continued)

FOREIGN PATENT DOCUMENTS

| DE | 296 03 480 | 4/1996 |
| GB | 904 807 | 8/1962 |

(Continued)

OTHER PUBLICATIONS

International Search Report corresponding to International Patent Application Serial No. PCT/EP2008/000216, Jan. 14, 2008.

*Primary Examiner* — Leo B Tentoni
(74) *Attorney, Agent, or Firm* — McAndrews, Held & Malloy, Ltd.

(57) ABSTRACT

The present invention relates to a method of making mineral fibers, comprising providing a circulating combustion chamber (1) which comprises a top section (2), a bottom section (3) and a base section (4), injecting primary fuel, particulate mineral material and primary combustion gas into the top section of the circulating combustion chamber and combusting the primary fuel thereby melting the particulate material to form a mineral melt and generating exhaust gases, separating the mineral melt from the exhaust gases wherein the exhaust gases pass through an outlet (8) in the circulating combustion chamber and the mineral melt collects in the base section of the circulating combustion chamber, injecting secondary fuel, which comprises liquid or gaseous fuel, and secondary combustion gas into the bottom section of the circulating combustion chamber to form a flame in the bottom section which heats the melt, and flowing a stream of the collected melt through an outlet (15) in the base section to a centrifugal fiberising apparatus and forming fibers. The present invention also provides an apparatus for use in the method of the invention.

21 Claims, 1 Drawing Sheet

(56) References Cited

U.S. PATENT DOCUMENTS

| | | | | |
|---|---|---|---|---|
| 4,544,394 A | * | 10/1985 | Hnat | 65/27 |
| 4,632,687 A | * | 12/1986 | Kunkle et al. | 65/27 |
| 4,925,387 A | * | 5/1990 | Locanetto et al. | 431/187 |
| 2005/0138964 A1 | | 6/2005 | Edlinger | |
| 2005/0172677 A1 | * | 8/2005 | Jensen et al. | 65/469 |

FOREIGN PATENT DOCUMENTS

| | | |
|---|---|---|
| WO | WO 03/002469 | 1/2003 |
| WO | WO 2008/086990 | 7/2008 |

* cited by examiner

PROCESS OF AND APPARATUS FOR MAKING MINERAL FIBERS

This application is a 371 National Phase filing of International Patent Application Serial No. PCT/EP2008/000216 filed Jan. 14, 2008, which claims priority to European Patent Application Serial No. 07250138.0 filed Jan. 15, 2007. Both of the above-referenced applications are incorporated herein by reference in their entirety.

BACKGROUND TO THE INVENTION

This invention relates to the production of a mineral melt by burning combustible material in the presence of inorganic particulate material and thereby forming a melt. The melt is then fiberised to form mineral fibres.

Traditionally, the normal way of producing a melt for slag, stone or rock fibres has been by means of a shaft furnace in which a self-supporting stack of inorganic particulate material is heated by combustion of combustible material in the furnace. The stack gradually melts and is replenished from the top, with melt draining down the stack and out from the bottom of the furnace. The normal furnace for this purpose is a cupola furnace.

It is necessary for the stack to be self-supporting and permeable to the combustion gases, which are generally generated by combustion of carbonaceous material in the stack. It is therefore necessary that everything in the stack is relatively coarse (in order that the stack is permeable) and has high physical strength and does not collapse until combustion or melting is well advanced. In practice this means that the carbonaceous material is coke and the particulate material is either coarsely crushed rock, stone or slag or is in the form of briquettes formed from fine particulate material.

Accordingly, if the material which is available is only available in finely divided form, it is necessary to incur the expense and inconvenience of forming it into briquettes. Briquetting usually uses sulphur-containing materials as binder, such as Portland cement with gypsum, and this means that the effluent is liable to have a high sulphur content, which has to be treated.

The cupola or other stack furnace system also has the disadvantage that conditions in the furnace always tend to be sufficiently reducing that some of the iron is reduced to metallic iron. This necessitates separating metallic iron from the melt, reduces wool production, leads to the provision of iron waste and also tends to incur the risk of corrosion in the zone containing iron and slag.

Another disadvantage is that the process does not have high thermal efficiency.

Despite these disadvantages, the process using a cupola or other stack furnace has been widely adopted throughout the world for the manufacture of rock, stone or slag fibres.

An alternative and entirely different system for the production of a mineral melt that avoids or reduces the disadvantages of the cupola system is disclosed in our earlier publication WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace.

The suspension of coal in preheated air, and the particulate mineral material, are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber.

In WO03/002469, the combustion chamber preferably leads downwards into a large settling tank which has a considerably enhanced volume. There may be a gas burner or other means for supplying extra energy to the settling tank to raise the temperature of the exhaust gases. The burner is positioned towards the top of the settling tank. The exhaust gases which are free of melt are taken from the settling tank or the combustion chamber up through a duct at the top of the chamber.

In order to increase the energy efficiency of the cyclone furnace in WO03/002469, the exhaust gases, which leave the circulating chamber at a temperature in the range of 1400 to 1700° C. are used to preheat the particulate material so as to use rather than waste this heat energy. This step can be carried out under conditions which reduce nitrogen oxides (NOx) which reduces the environmental effects of the exhaust gases. The exhaust gases then pass through another heat exchanger by which there is indirect heat exchange with the combustion air.

The cyclone furnace has significant advantages compared to cupola or other stack furnaces. With respect to fuel, it avoids the need for briquetting fine particles and a wide range of fuels can be used including, for example, plastic. Using a melting cyclone furnace eliminates the risk of reduction of the ores to iron and releases exhaust gases which are environmentally acceptable. The flexibility in melt capacity is much better than with a cupola furnace meaning that production can easily and quickly be switched, from, for example, 40% to 100% of total capacity so the time taken to respond to changing demand is greatly reduced. Furthermore, melting in a cyclone furnace is much quicker than is the case for a cupola furnace and is in the order of minutes, rather than in the order of hours.

Hence, using a melting cyclone furnace system is economically and environmentally desirable and the system disclosed in WO 03/002469 works well. There is, however, room for improvement in the process.

In processes for making mineral fibres, such as that in WO03/002469, the temperature and associated viscosity of the melt is extremely important as it has a direct effect on the quality of the mineral fibres produced. The purity is also important. In the system of WO03/002469 there are no means for controlling the temperature of the melt leaving the settling tank so this may vary which, without further treatment, will mean that the quality of the melt will vary.

Furthermore, although in WO03/002469 several steps are taken to recycle the large amount of energy used in producing the melt, there is inevitably a large amount of energy that is lost due to the large volume of the settling tank and the high volume of combustion air which is used. It is desirable to increase the energy efficiency of the system further.

WO03/002469 suggests a second embodiment shown in FIG. 2 in which the settling tank is replaced by a relatively small collection zone at the base of the combustion chamber. Such systems would lead to increased energy efficiency due to the reduced volume of the apparatus through which energy is lost. However, the inventors have found that in this system the melt quality is reduced, and is also subject to variations.

U.S. Pat. No. 4,365,984 is also concerned with producing mineral wool using a melting cyclone furnace and involves feeding a particulate waste material containing inorganic non-combustible and organic combustible components into combustion air. As in WO03/002469, the system includes a large collection zone. In U.S. Pat. No. 4,365,984 the temperature of the melt is said to be important for fiberisation. This publication teaches that the melt temperature can be adjusted by adding additional reverts (mineral wool waste products) to the furnace with the fuel.

Melting cyclones can be used to melt or treat mineral materials that are not subsequently used to make fibres. For example U.S. Pat. No. 4,544,394 concerns a method of melting glass in a vortex reactor and U.S. Pat. No. 6,047,566 concerns a method of melting recycled silicate materials. The temperature and hence viscosity of the melt is not a key factor in these processes.

Melting cyclones are also known in other fields, particularly the field of pyrometallurgic processes (such as in U.S. Pat. No. 4,566,903 and U.S. Pat. No. 5,282,883). In such processes, the end product is a molten metal and any molten mineral material that is present is a waste material. Therefore, the quality of the mineral melt is unimportant in such processes.

In US 2005/0039654, a cyclone chamber is used to combust fuel to generate energy for use for other purposes. Mineral material is not added to the system as the purpose is not to make a melt, but the fuel that can be used can be so-called "slagging coal" which contains some mineral materials that are not combustible but melt to form a slag when the coal is combusted.

This publication is concerned with the selective use of oxygen enrichment at various points in the barrel of the cyclone combuster to maintain the slag in a molten form, to minimise NOx emissions and to minimise the escape of fine coal particles in the barrel. Air (referred to as a first or primary oxidant having an oxygen concentration of about 21% by volume) is introduced into the burner with the fuel. A second oxidant stream which has a concentration greater than the first can be introduced either into a region adjacent to the coal, or into the barrel. The second oxidant mixes with a portion (but not all) of the first oxidant to give a region of mixed oxidant which is said to contain less than about 31% oxygen by volume (so the oxygen level of the total oxidant i.e. combustion gas is much lower than 31%).

There is no suggestion in this publication to increase the levels of oxygen further or to add fuel to the system, other than the coal which is added to the burner.

The present invention is concerned with a method of making high quality mineral fibres in an energy efficient manner.

SUMMARY OF THE INVENTION

According to a first aspect, the present invention provides a method of method of making mineral fibres, comprising providing a circulating combustion chamber which comprises a top section, a bottom section and a base section, injecting primary fuel, particulate mineral material and primary combustion gas into the top section of the circulating combustion chamber and combusting the primary fuel thereby melting the particulate material to form a mineral melt and generating exhaust gases, separating the mineral melt from the exhaust gases wherein the exhaust gases pass through an outlet in the circulating combustion chamber and the mineral melt collects in the base section of the circulating combustion chamber, injecting secondary fuel and secondary combustion gas into the bottom section of the circulating combustion chamber to form a flame in the bottom section which heats the melt, and flowing a stream of the collected melt through an outlet in the base section to a centrifugal fiberising apparatus and forming fibres.

According to a second aspect, the present invention provides an apparatus for use in a method of making mineral fibres according to the first aspect of the invention, comprising a circulating combustion chamber comprising a substantially cylindrical top section, a bottom section and a base section wherein the circulating combustion chamber comprises inlets in the top section for primary fuel, particulate mineral material and primary combustion gas, inlets in the bottom section for secondary fuel and secondary combustion gas, an outlet for exhaust gases, an outlet in the base section and centrifugal fiberising apparatus, wherein the outlet in the base section leads to the centrifugal fiberising apparatus.

The method of the present invention essentially includes forming a flame in the bottom section of the combustion chamber. This is achieved by injecting a secondary fuel and a secondary combustion gas into the bottom section. Forming a flame in this section is highly advantageous as it is a mechanism by which the melt temperature can be changed. The secondary fuel can be all a solid fuel such as coal but preferably also comprises liquid or gaseous fuel.

In the bottom section of the circulating combustion chamber the mineral melt flows down the walls to be collected in the base section. In this region the melt is present as a thin film on the walls of the chamber and as a bath in the base section, which is normally shallow. Hence, applying radiant heat in this area is particularly effective as it can penetrate the whole of the melt easily. Therefore, using a flame in this region is particularly effective at heating the melt homogeneously. It can also heat the melt rapidly and precisely so that by varying the flow rate of secondary fuel and secondary combustion gas, the temperature of the melt can be maintained within precise limits.

In contrast, in prior art systems the temperature of the melt is not controlled in the chamber. Where the melt is not collected in the bottom of the chamber, but is collected in a separate (usually larger) tank, it would not be possible to achieve the effect of heating both the melt bath and the melt flowing down the walls of the chamber.

As the chamber of the present invention incorporates the collection zone it is very compact and a high level of energy efficiency can be achieved as surface area losses are minimised.

In the present invention the proportion of secondary fuel and secondary combustion gas can be manipulated to provide the desired results. When the oxygen provided in the secondary combustion gas is insufficient to enable the secondary fuel to undergo complete combustion (i.e., there is a sub-stoichiometric level of oxygen) the flame will be extended over a bigger volume than when sufficient gas to enable complete combustion is introduced with the secondary fuel. This can be advantageous as the flame can extend over a substantial proportion of the melt bath and therefore be extremely efficient at transferring radiant heat to it.

In a further embodiment, when the primary fuel used is one, such as coal, which combusts in two stages, it is advantageous to introduce the secondary fuel and secondary combustion gas in proportions such that there is more than sufficient oxygen in the secondary combustion gas to enable the secondary fuel to undergo complete combustion. The excess oxygen acts to raise the oxygen levels in the bottom section of the chamber. This oxygen can help to increase the burn-out of particulate fuel such as coal which do not combust completely in one initial stage.

Having excess oxygen in the bottom section is particularly important when the primary combustion gas is air which has been enriched with oxygen, or pure oxygen, as in this case the volume of gas is typically less and the concentration of the char particles is increased. Hence, fuel particles frequently do not have sufficient time to burn-out fully in the upper regions of the combustion chamber.

A further means of enabling burn-out of char particles is the provision of a siphon outlet. This also promotes effective heating of the melt by the flame and prevents char particles from leaving the chamber in the melt.

The present invention provides a simple but extremely effective way of controlling the temperature of the mineral melt, thereby enabling mineral fibres of a high quality to be made in an energy efficient and therefore environmentally friendly and cost effective manner.

DETAILED DESCRIPTION

The circulating combustion chamber in the present invention is of the type which is frequently referred to as a cyclone furnace. It has a top section, a bottom section and a base section. The construction of suitable cyclone furnaces is described in various patents including U.S. Pat. Nos. 3,855,951, 4,135,904, 4,553,997, 4,544,394, 4,957,527, 5,114,122 and 5,494,863.

The chamber is generally vertically rather than horizontally inclined. It normally has a cylindrical top section, a frustoconical bottom section and a base section but can be wholly cylindrical. The base section is preferably an integral part of the chamber and can be simply the end part of the frustoconical bottom section or can be a cylindrical section at the end of the bottom section.

The internal diameter of the base section is not larger than the internal diameter of the upper section, in contrast to traditional systems which often employ a tank at the base of the chamber of enhanced volume.

An advantage of the invention, particularly in the preferred embodiment wherein oxygen enriched air or pure oxygen is used as the primary combustion gas, is that a compact combustion chamber can be used. Hence, it is preferred in the present invention that the combustion chamber is an integral chamber. By this, we mean that the chamber is not made up of different component parts which can be separated from one another. The ability to use compact furnaces compared to prior art systems minimises the surface area losses of energy from the furnace.

The chamber volume is preferably less than about 25 $m^3$, preferably less than about 20 $m^3$ or 15 $m^3$, or even less than 10 $m^3$.

For example, to produce about 20 tons per hour of melt using 30% oxygen as the primary combustion gas, the volume of the circulating combustion chamber would need to be about 15 $m^3$. In comparison, when using pure oxygen as the primary combustion gas, the chamber volume would only need to be about 5 $m^3$. Therefore, when making use of the invention to allow the use of pure oxygen as the primary gas, a much smaller and hence much more energy efficient cyclone can be used for a particular throughput.

The primary fuel and generally also the particulate mineral material and primary combustion gas are injected into the top section of the combustion chamber, which is usually cylindrical. The chamber has an outlet where hot exhaust gases can exit the chamber. This is preferably in the top section although it may be in the bottom section. In the top section the primary fuel combusts in the combustion gas and causes the particulate mineral material to melt. The mineral melt is then thrown against the sides of the chamber by the action of the circulating currents and flows down the sides of the chamber, due to the force of gravity, and collects in the base section of the chamber. The base section has an outlet for the mineral melt through which the melt passes as a stream and is then subjected to fiberisation in any conventional manner, for instance using a cascade spinner or a spinning cup or any other conventional centrifugal fiberising process.

It is preferred that, at the point at which the outlet for mineral melt leaves the base section of the chamber, it does not immediately extend down but, instead, the outlet is a siphon. By a "siphon" we mean that the outlet, which is usually a tube or guttering, initially has an upward orientation relative to the opening in the chamber and subsequently has a downward orientation before leading to the fiberising equipment.

As is normal with a siphon, the result is that, in order for the melt to leave the chamber, the melt bath inside the chamber must be deep enough to reach the vertically highest point of the siphon outlet. When this happens, gravity causes the melt to pass up through the upwardly oriented part of the siphon and then flow down the subsequent part of the siphon to the fiberising equipment. Hence, this creates an air-lock in the system which ensures that exhaust gases cannot escape from the base of the chamber.

Using a siphon is particularly advantageous in the embodiment where a particulate fuel, such as coal, is used and leads to improvements in the melt quality. This is due to the fact that char particles, which are fuel particles that have not combusted completely in the top or bottom sections of the chamber, may collect on top of the melt pool and float there. These char particles are prevented from exiting the chamber with the melt by the siphon.

By enabling the char particles to collect on the melt, their residence time in the chamber is increased compared to when a siphon is not used. Hence, the char particles can complete their combustion in the base zone to achieve full burn-out of the fuel. This ensures that the energy efficiency of the process is optimised.

Burn-out in the base section of char particles floating on the melt is enhanced by the addition of secondary combustion gas into the bottom section of the circulating combustion chamber.

A further advantage relates to the relative proportions of iron II and iron III in the melt. Traditionally, cupola furnaces have been used to make mineral melts which have a highly reducing atmosphere. As a result of this, almost all the iron oxide in melts produced by cupola furnaces is in the form of iron II. Iron II is good for the fire resistant properties of the fibres as it is converted to an iron III crystalline structure at high temperatures.

However, cyclone systems such as that of the present invention are far more oxidising, particularly when the primary gas is oxygen enriched air. In this case, a substantial proportion of the iron in the melt can be in the form of iron III rather than iron II. When a siphon is used, the melt comes into contact with the char particles which are trapped floating on it. As the char particles are highly reducing, they act to reduce the iron III in the melt to iron II thereby ensuring good fire resistant properties for the fibres are maintained.

The general motion of gases and suspended particulate material in the circulating combustion chamber is a cyclone motion. This is created by introduction of the primary combustion gas, as well as particulate fuel and mineral material, at an appropriate angle to sustain the swirling motion. The secondary combustion gas and fuel is also preferably introduced with the same directional momentum so as to sustain the circulating currents.

In the bottom section of the circulating combustion chamber, which is normally frustoconical in shape, a secondary fuel which is liquid or gaseous and a secondary combustion gas is injected.

The secondary fuel can be any fuel that undergoes combustion.

In one embodiment, the secondary fuel comprises liquid or gaseous fuel and in particular can comprise any highly flammable liquid or gas. In this embodiment the secondary fuel can also comprise minor amounts (less than 50%, preferably less than 20% or 10% by energy) of solid or liquid particulate fuels which combust in a two stage process. These can be, for example, solid fuels such as coal or coke, or liquid fuels such as droplets of oil. As the less flammable component is included at a low level, it does not substantially affect the rapid and complete combustion of the secondary gas as a whole. In this embodiment, preferably the secondary fuel is selected from the group consisting of propane, methane, natural gas and alcohols, or mixtures thereof, optionally with a minor amount of coal or oil.

In an alternative, and preferred embodiment, the secondary fuel comprises up to 100% of a solid fuel. This can be any carbonaceous material that has a suitable calorific value as noted below with respect to the primary fuel, but as with the primary fuel is preferably coal. In this embodiment, the secondary fuel preferably comprises 70 to 90% solid fuel. This embodiment has economic advantages as coal is less expensive than gaseous fuels such as natural gas. Using a solid fuel such as coal has also been found to result in reduced NOx formation. This is likely to be due to the fact that coal creates reducing conditions in the bottom of the chamber.

In the most preferred embodiment, the secondary fuel comprises at least 50%, preferably 70 to 90% solid fuel such as coal with the remainder of the secondary fuel being liquid or gaseous fuel such as natural gas supplied through an oxy-fuel burner.

The secondary combustion gas can be at ambient temperature or preheated and preferably comprises a higher level of oxygen than air, such as over 25% oxygen. It is usually oxygen enriched air or pure oxygen. When the secondary combustion gas is oxygen enriched air, it preferably comprises at least 30%, preferably at least 35%, more preferably at least 50% and most preferably at least 70% or even at least 90% oxygen by volume. The oxygen enriched air also comprises other gases that are present in air, such as nitrogen, and can comprise gases that are not normally present in air, such as inert gases or flammable gases such as propane or butane, provided that the total oxygen content is more than in air (which is around 21% by volume). In the most preferred embodiment the secondary combustion gas is pure oxygen.

By "pure oxygen" we mean oxygen of 92% purity or more obtained by .e.g, the vacuum pressure swing absorption technique (VPSA) or it may be almost 100% pure oxygen obtained by a distillation method.

In another embodiment, to optimise energy savings associated with the increased cost of oxygen compared to air, the gas comprises 30 to 50% oxygen.

The secondary combustion gas and secondary fuel can be introduce separately into the bottom section, providing that sufficient mixing occurs to form a flame in the bottom section. Where the secondary fuel is a solid it can be introduced through a fuel feed pipe which has the same design as the primary fuel outlet. However, preferably the secondary combustion gas and secondary fuel are introduced together through at least one burner inlet, colloquially known as an oxy-fuel burner. This is particularly useful for the liquid of gaseous secondary fuels. The burner inlet or burner inlets are positioned in the lowest half of the bottom section of the circulating combustion chamber, preferably at the bottom of the bottom section, adjacent the base section so that the flame produced can heat the melt effectively. Preferably the flow rates of secondary combustion gas and secondary fuel are adjustable so the melt temperature can be changed as desired.

Secondary gas inlets may be provided in addition to oxy-fuel-burners, particularly in the embodiment where excess oxygen is added to the system.

As noted above, the relative proportions of the secondary combustion gas and secondary fuel can be altered depending on the circumstances.

In one embodiment the secondary fuel and secondary combustion gas are introduced in proportions such that there is insufficient oxygen in the secondary combustion gas to enable the secondary fuel to undergo complete combustion. For example, there can be 0.7, or 0.5 times the amount of oxygen in the secondary gas required to enable the secondary fuel to undergo complete combustion. This means that the flame has a tendency to be extended over a wide area.

Typically, the bottom section of the chamber has some oxygen in the atmosphere but the levels are low. Consequently, the flame spreads more widely across the bottom zone than if the oxygen levels were higher. In this case a large flame is formed which can heat a larger area of the melt effectively.

In a different embodiment, when the primary fuel used is one, such as coal, which combusts in two stages, it is advantageous to introduce the secondary fuel and secondary combustion gas in proportions such that there is more than sufficient oxygen in the secondary combustion gas to enable the secondary fuel to undergo complete combustion. The amount of oxygen is advantageously at least 1.3, preferably at least 1.5, more preferably at least 3 or 5 times the amount that would be required to enable the secondary fuel to combust completely.

In general however, it is preferred that the secondary fuel and secondary combustion gas are added is equal stoichiometric proportions, so that the gas is sufficient just to enable complete combustion of the fuel.

The primary fuel can be any combustible material and can be provided in any form. For, example, it can be a gas or liquid which is highly flammable and burns very quickly on entering the chamber, such as propane, methane, natural gas. The secondary fuel is present in a lower amount than the primary fuel and makes up less than 40%, typically 5 to 15% of the total fuel energy.

However, the one embodiment where secondary combustion gas contains oxygen in a stoichiometric excess with regard to the secondary fuel, the primary fuel can be a particulate, such as coal, which combusts in a two-stage process. In the first stage, which is known as pyrolysis, the volatile compounds burn very quickly with rapid evolution of gas. This generates char particles which are rich in carbon. The second stage is combustion of the char particle which is much slower than the first stage. The second stage typically takes between 10 and 100 times longer than the first stage. Hence, while the first stage of combustion occurs almost instantaneously when a fuel particle enters a combustion chamber, the second stage does not normally occur unless the fuel has a significant residence time. If the fuel is incompletely combusted leaving some char in the melt, the melt quality will be reduced and may include bubbles or other discontinuities in the fibres produced. However, in the invention when excess oxygen is introduced into the bottom section, it increases the oxygen levels in the bottom section of the chamber so promotes rapid and complete combustion of the char particles.

During use of the chamber, in this embodiment of the present invention, the chamber comprises an upper zone, a lower zone and a base zone.

The upper zone is characterised in that pyrolysis, the initial stage of combustion of the particulate fuel, takes place. This corresponds broadly to the cylindrical top section of the chamber. The particulate fuel and preferably also the particulate mineral material and primary combustion gas are injected into the upper zone. The upper zone also includes an outlet through which hot gases pass.

Pyrolysis of the fuel in the upper zone creates char, a carbon rich material. The char particles are generally thrown onto the surfaces of the chamber by the circulating gases and flow, with the melt, down the surfaces of the chamber under the action of gravity.

The lower zone is characterised by the combustion of char. Hence, the lower zone generally corresponds to the frusto-conical bottom section of the chamber, particularly the surfaces of the chamber in this section. Char particles may also be present on the surface of the top section of the chamber, and floating on the horizontal surface of the melt pool in the base zone.

Hence the upper zone generally extends over the majority of the top section, of the chamber whereas the lower zone extends over the majority of the bottom section, particularly the surfaces of the bottom section of the chamber and may also extend to some extent on to the surfaces of the top section of the chamber.

Typically in the lower region of a circulating combustion chamber of the type which has separation of gas at the top and melt at the bottom, oxygen levels are low, even if an excess of oxygen has been added in the upper region. Therefore, char in traditional systems needs a long residence time to burn in this region. In the present invention, secondary combustion gas is injected into the lower zone to aid the second stage of combustion, i.e., combustion of the char particle. Therefore, complete combustion of the fuel occurs in the lower zone in the method of the present invention.

In this embodiment the primary particulate fuel can be in liquid or solid form. Where the primary fuel is a liquid, it is used in the form of droplets, i.e., particles of liquid fuel. In this embodiment, the fuel can be particles of oil or other carbon based liquids.

However, the primary particulate fuel in the present invention is preferably solid. It is generally a carbonaceous material and can be any particulate carbonaceous material that has a suitable calorific value. This value can be relatively low, for instance as low as 10000 kJ/kg or even as low as 5000 kJ/kg. Thus it may be, for instance, dried sewage sludge or paper waste. Preferably it has higher calorific value and may be spent pot liner from the aluminium industry, coal containing waste such as coal tailings, or powdered coal.

In a preferred embodiment, the primary fuel is powdered coal and may be coal fines but preferably some, and usually at least 50% and preferably at least 80% and usually all of the coal is made by milling lump coal, for instance using a ball mill. The coal, whether it is supplied initially as fines or lump, may be good quality coal or may be waste coal containing a high inorganic content, for instance 5 to 50% inorganic with the balance being carbon. Preferably the coal is mainly or wholly good quality coal for instance bituminous or sub-bituminous coal (ASTM D388 1984) and contains volatiles which promote ignition.

The primary fuel particles preferably have a particle size in the range from 50 to 1000 µm, preferably about 50 to 200 µm. Generally at least 90% of the particles (by weight) are in this range. Generally the average is about 70 µm average size, with the range being 90% below 100 µm.

The primary fuel can be fed into the chamber through a feed pipe in a conventional manner to give a stream of fuel particles. This normally involves the use of a carrier gas in which the fuel particles are suspended. The carrier gas can be air, pure oxygen enriched air or oxygen, preferably at ambient temperature to avoid flashbacks or a less reactive gas such as nitrogen. The feed pipe is preferably cylindrical.

The particulate mineral material is any material that is suitable for making mineral fibres which can be glass fibres or rock stone or slag fibres. Glass fibres typically have a chemical analysis, by weight of oxides, of above 10% $Na_2O+K_2O$, below 3% iron as FeO, below 20% CaO+MgO, above 50% $SiO_2$ and below 5% $Al_2O_3$. Rock, stone or slag fibres typically have an analysis, by weight of oxides, of below 10% $Na_2O+K_2O$, above 20% CaO+MgO above 3% iron as FeO, and below 50% $SiO_2$ and, often, above 10% $Al_2O_3$. The mineral material can be waste materials such as mineral fibres which have already been used or which have been rejected before use from other processes.

The particulate mineral material, which is melted in the chamber to produce the mineral melt, is introduced into the upper section of the chamber so that it becomes suspended in the gases therein. The point at which the particulate mineral material is added is not critical and it can be mixed with the fuel and injected through the fuel feed pipe. It is, however, preferable to add the particulate mineral material into the burning fuel. This can be achieved by adding the particulate mineral material into the chamber though an inlet in a conventional way, for example at or near to the top of the chamber.

Primary combustion gas is introduced into the upper section of the chamber and can be at ambient temperature or can be preheated. When the gas is heated, the maximum desirable temperature that the primary combustion gas is pre-heated to is around 600° C., and the preferred preheating is to between 300 and 600° C., most preferably to around 500 to 550° C. The primary combustion gas can be any gas in which the fuel can combust, for example, air, air enriched with oxygen or pure oxygen. It can also include propane or methane.

In the preferred embodiments the primary combustion gas contains at least 25% oxygen. It is preferably oxygen enriched air which comprises at least 30%, preferably at least 50%, most preferably at least 70% oxygen by volume or pure oxygen. The oxygen enriched air may comprise minor amounts of gases that are not typically present in air.

Where pure oxygen is used it is preferably at ambient temperature, rather than being preheated. In this embodiment where the primary combustion gas is oxygen enriched air or pure oxygen, the total volume of primary combustion gas used can be much less than where air alone is used as the primary combustion gas, as only the oxygen is used for combustion. Hence, significant energy savings can be made through the use of oxygen enriched air or pure oxygen as the lower volume of combustion gas requires less energy to heat. Using oxygen enriched air or pure oxygen also means that the circulating combustion chamber can be smaller than when air is used. This also leads to energy savings.

The primary combustion gas may be introduced through a feed pipe with the fuel suspended in it, especially when the gas is at a relatively low temperature. The fuel should not begin to combust in the fuel pipe before it enters the chamber (a phenomenon known as "flash back") so low gas temperatures are needed in this embodiment. However, the primary combustion gas is preferably introduced separately through one or more combustion gas inlets which can be located in the vicinity of the fuel feed pipe so that the combustion gas is directed into the chamber in the same region as the fuel, to allow for efficient mixing. In the most preferred embodiment, the combustion gas inlet concentrically surrounds the feed pipe and the secondary gas inlet, as discussed below.

Whether or not they are introduced together, the speed at which the combustion gas and the fuel are injected into the chamber is relatively low (preferably between 1 and 50 m/s), so as to minimise wear of the apparatus. When the fuel is suspended in the combustion gas, the speed is preferably between 5 and 40 m/s. When they are introduced separately, which is preferred, the injection speed of the fuel is preferably 20 to 40 m/s.

It is desirable to ensure that the particulate fuel is mixed rapidly and thoroughly with the primary combustion gas as this ensures that the fuel is ignited rapidly so that it can undergo pyrolysis almost immediately after introduction into the chamber. Having thorough mixing also ensures that the residence time of the fuel particles in the primary combustion gas is more uniform thereby leading to more efficient fuel combustion.

To help ensure rapid and thorough mixing in one embodiment of the invention an additional gas can be introduced in the upper zone which travels at a higher speed than the primary combustion gas and the particulate fuel and, due to the speed differential, causes turbulence of the stream of fuel particles thereby breaking up the stream and ensuring rapid mixing. The additional gas is generally much less voluminous than the combustion gas and typically makes it less than 40% of the total gas injected into the combustion chamber, preferably between 10 and 30%. The additional gas can be any gas including air, nitrogen, oxygen, or a flammable gas such as propane or butane. The additional gas may be injected from an inlet so that it is adjacent the stream of fuel particles in the chamber but is preferably injected to an inlet that concentrically surrounds the fuel inlet. This concentric arrangement leads to efficient mixing, particularly where the additional gas inlet has a converging nozzle at its opening. The additional gas is preferably travelling at least 100 m/s faster than the fuel and the combustion gas, usually at least 250 m/s, preferably at least 300 m/s. In the most preferred embodiment, the injection speed of the additional gas is sonic, i.e, at or above the speed of sound.

FIGURES

Figure 1:
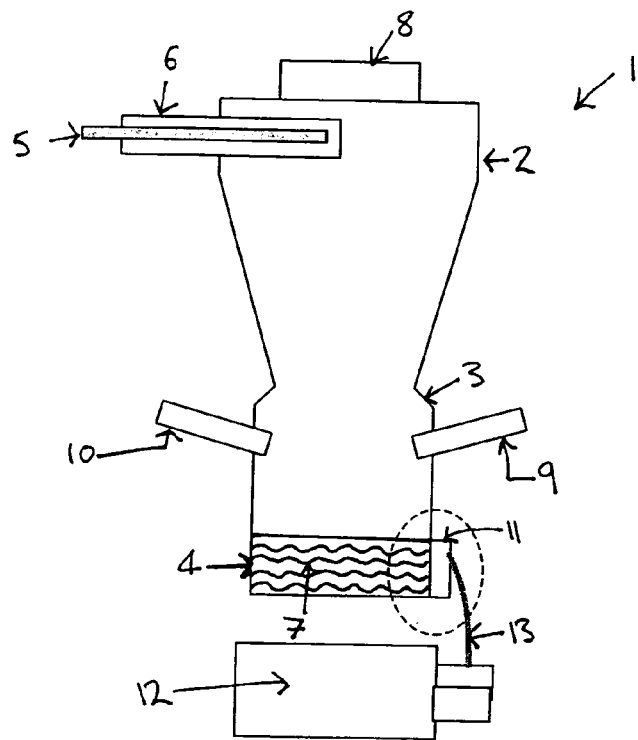
FIG. 1 is an illustration of apparatus which is suitable for use in a preferred embodiment of the present invention.

FIG. 1 shows a circulating combustion chamber 1 which comprises a top section 2, a bottom section 3 and a base section 4. Primary fuel and particulate material are introduced through inlet 5 with primary combustion gas being introduced through inlet 6 which concentrically surrounds inlet 5. The primary fuel is ignited and burns in the upper section 2 and is collected in the base section 4 as a melt pool 7. The hot exhaust gases pass through the flue gas outlet 8 at the top of the combustion chamber. Secondary fuel and secondary combustion gas are injected through an oxy-fuel burner 9 and form a flame in the bottom region 3 which acts to heat the melt pool 7. Further secondary combustion gas is introduced through oxygen inlets 10 in the bottom region 3 which aids burn-out of the fuel in this region. The melt flows through siphon 11 to fiberising equipment 12 where it is formed into fibres.

Figure 2:
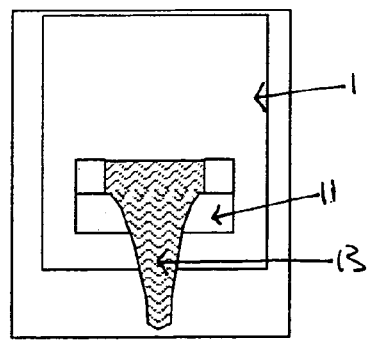
FIG. 2 is a front view of the siphon which is shown in the dotted oval of FIG. 1.

FIG. 2 shows a front view of the siphon 11 with a stream of melt 13 exiting the siphon 11.

Figure 3:
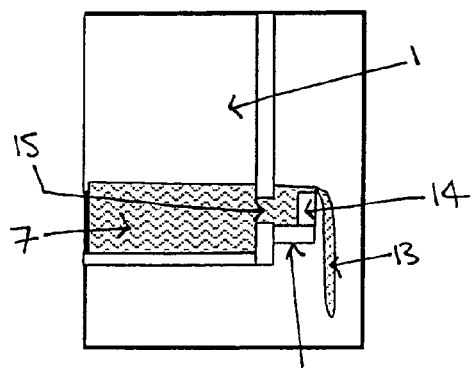
FIG. 3 is a side view of the siphon shown in the dotted oval of FIG. 1.

FIG. 3 shows a cross-section of the siphon 11 which has a part which is upwardly oriented 14 and rises vertically above the opening 15 in the chamber 1. Once the melt bath 7 gets above the level of the vertically oriented part 14, the melt flows over that part as stream 13.

EXAMPLE

The inventors have demonstrated that providing fuel as secondary fuel into the bottom section of the circulating combustion chamber is a very efficient way to increase the melt temperature. In the tests performed, the total amount of fuel energy (primary and secondary) into the cyclone was increased by 2%. The extra fuel was added as secondary fuel provided at the bottom of the chamber. The amount of primary fuel was kept constant. This led to an increase in the melt temperature of 40-50° C.

To achieve the same temperature rise of the melt in a cupola furnace, much more than 2% extra energy would be needed.

The high efficiency of the present invention is due to the fact that adding fuel energy in the bottom section can rapidly and efficiently heat the thin layer of melt running down the sides of the chamber and in the base of the chamber.

The invention claimed is:

1. A method of making mineral fibers, comprising
providing a circulating combustion chamber which comprises a top section, a bottom section and a base section,
injecting primary fuel, particulate mineral material and primary combustion gas into the top section of the circulating combustion chamber and combusting the primary fuel thereby melting the particulate material to form a mineral melt and generating exhaust gases,
separating the mineral melt from the exhaust gases wherein the exhaust gases pass through an outlet in the circulating combustion chamber and the mineral melt collects as a melt pool in the base section of the circulating combustion chamber,
injecting secondary fuel and secondary combustion gas into the bottom section of the circulating combustion chamber, above the melt pool, to form a flame in the bottom section which heats the melt, and
flowing a stream of the collected melt through an outlet in the base section to a centrifugal fiberizing apparatus and forming fibers.

2. A method according to claim 1, wherein the secondary fuel comprises liquid or gaseous fuel.

3. A method according to claim 1, wherein the secondary fuel is selected from the group consisting of an alcohol, propane, methane, natural gas and mixtures thereof.

4. A method according to claim 1 wherein the secondary fuel comprises coal or oil, which makes up less than 50% of the total secondary fuel by volume.

5. A method according to claim 1 wherein the secondary fuel comprises a solid fuel.

6. A method according to claim 5 wherein the secondary fuel comprises between 70 and 90% solid fuel.

7. A method according to claim 1 wherein the secondary combustion gas is pure oxygen.

8. A method according to claim 1 wherein the secondary fuel and secondary combustion gas are introduced through at least two burner inlets so that immediately after entry to the circulating combustion chamber, the secondary fuel combusts to form a flame.

9. A method according to claim 8 wherein the burner inlets are positioned in the lower half of the bottom section of the circulating combustion chamber.

10. A method according to claim 1 wherein the proportion of secondary combustion gas and secondary fuel is such that there is insufficient secondary combustion gas to enable the secondary fuel to undergo complete combustion.

11. A method according to claim 1 wherein the proportion of secondary fuel and secondary combustion gas is such that there is more than sufficient secondary combustion gas to enable the secondary fuel to undergo complete combustion.

12. A method according to claim 8 wherein the circulating combustion chamber comprises a burner inlet in the bottom section and at least one further inlet for additional secondary combustion gas.

13. A method according to claim 1 wherein the outlet in the base section is a siphon.

14. A method according to claim 1 wherein the primary fuel is a particulate carbonaceous fuel.

15. A method according to claim 1 wherein the primary fuel is a mixture of a particulate carbonaceous fuel, and one or more gaseous fuels selected from the group consisting of propane, methane, natural gas, and a combination of two or more of these.

16. A method according to claim 1 wherein the primary combustion gas is oxygen enriched air or pure oxygen.

17. Apparatus for use in making mineral fibers comprising a circulating combustion chamber comprising a substantially cylindrical top section, a bottom section having a lower portion defining a melt collection zone, and a base section wherein the circulating combustion chamber comprises inlets in the top section for primary fuel, particulate mineral material and primary combustion gas, inlets for secondary fuel and secondary combustion gas located above the melt collection zone in the bottom section, an outlet for exhaust gases, an outlet in the base section and centrifugal fiberizing apparatus, wherein the outlet in the base section leads to the centrifugal fiberizing apparatus.

18. Apparatus according to claim 17, wherein the bottom section of the circulating combustion chamber is frustoconical.

19. Apparatus according to claim 17 wherein the outlet in the base section is a siphon.

20. The method of claim 1 wherein the secondary fuel comprises coal.

21. A method according to claim 1 wherein the primary fuel is coal.

\* \* \* \* \*